United States Patent [19]

Ranceze et al.

[11] Patent Number: 5,141,980
[45] Date of Patent: Aug. 25, 1992

[54] COMPOSITION USABLE FOR THE THERMAL AND ULTAVIOLET STABILIZATION OF THERMOPLASTIC RESINS AND THERMOPLASTIC RESINS CONTAINING SUCH A STABILIZING COMPOSITION

[75] Inventors: Dominique Ranceze, Lescar; Jean Boussely, Paris, both of France

[73] Assignee: Elf Atochem North America, Inc., Philadelphia, Pa.

[21] Appl. No.: 370,554

[22] Filed: Jun. 23, 1989

[51] Int. Cl.$^5$ ................................ C08K 00/00
[52] U.S. Cl. ................... 524/399; 252/400.3; 524/437; 524/436; 524/450
[58] Field of Search ............. 524/399, 436, 437, 450; 252/400.3

[56] References Cited

U.S. PATENT DOCUMENTS

| | | | |
|---|---|---|---|
| 4,000,100 | 12/1976 | Baldyga | 524/450 |
| 4,284,762 | 8/1981 | Miyata et al. | 524/451 |
| 4,299,759 | 11/1981 | Miyata et al. | 524/321 |
| 4,338,226 | 7/1982 | Worschech et al. | 524/450 |
| 4,371,656 | 2/1983 | Kashiwase et al. | 524/450 |
| 4,379,882 | 4/1983 | Miyata et al. | 524/436 |
| 4,427,816 | 1/1984 | Aoki et al. | 524/357 |
| 4,686,255 | 8/1987 | Erweid et al. | 524/450 |

*Primary Examiner*—Veronica P. Hoke
*Attorney, Agent, or Firm*—Richard A. Negin

[57] ABSTRACT

The invention relates to a composition which is usable for the stabilization of thermoplastic resin against the effects of heat and/or light.

This composition comprises a hydrotalcite, a zinc zeolite and a zinc carboxylate.

It is applied, more especially, to thermoplastic resins containing halogens, and in particular to PVC.

13 Claims, No Drawings

COMPOSITION USABLE FOR THE THERMAL AND ULTAVIOLET STABILIZATION OF THERMOPLASTIC RESINS AND THERMOPLASTIC RESINS CONTAINING SUCH A STABILIZING COMPOSITION

BACKGROUND OF THE INVENTION

This invention relates to a stabilizing composition for thermoplastic resin, and more specifically for thermoplastic resin containing halogens, against the effects of heat and/or light. In particular, it relates to a ternary stabilizing composition comprising a hydrotalcite, a zinc zeolite and a zinc carboxylate.

BACKGROUND ART

It is known that thermoplastic resins containing halogens and/or compounds of an acidic nature originating from the catalysts and/or the monomers and/or post-halogenation, for example resins originating from monomers or comonomers containing halogens, such as vinyl chloride polymer or copolymers, resins obtained using catalysts such as boron trifluoride, tin tetrachloride or potassium persulphate, and post-halogenated resins such as postchlorinated resins, as a result of the fact that they contain halogens and/or compounds of an acidic nature, can corrode or rust the metal parts of moulds and moulding machines. It is also known that these resins, and the products moulded from the said resins, undergo a degradation through the effect of heat or of ultra-violet radiation.

For example, when exposed to heat or to ultra-violet radiation, vinyl chloride resins undergo a dehydrochlorination within their molecular chains, which causes both a degradation and a colouration of the resins, and corrosion of the moulds and moulding machines.

U.S. Pat. No. 4,299,759 teaches that hydrotalcites are efficient heat stabilizers for thermoplastic resins. U.S. Pat. No. 4,427,816 describes a binary stabilizing system consisting of a β-diketone and a hydrotalcite.

The hydrotalcites may be represented by the general formula:

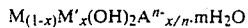

$$M_{(1-x)}M'_x(OH)_2A^{n-}{}_{x/n}\cdot mH_2O \qquad (I)$$

in which:

M and M' are divalent and trivalent metal cations, respectively, x satisfies the relationship $0 < x \leq 0.5$, m is a positive number, and $A^{n-}$ is an anion of valency n.

Preferably, M is magnesium and M' is aluminium, as a result, hydrotalcites correspond to the formula:

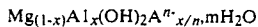

$$Mg_{(1-x)}Al_x(OH)_2A^{n-}{}_{x/n}\cdot mH_2O$$

Appropriate anions comprise $CO_3^{2-}$, $SO_4^{2-}$, $\cdot O_2C\text{-}CO_2^{2-}$, $HPO_4^{2-}$ and the like. The chosen hydrotalcites preferably have a specific surface area of less than 30 m²/g and a particle size of less than 5 microns. Such hydrotalcites and the like are described by W. T. Reichle in "Anionic Clay Minerals" (CHEMTECH, January 1986 p. 58–63) and by S. Miyata in "Clays and Clay Minerals" (vol. 31, No. 4, 305–311, 1983).

However, hydrotalcites are expensive substances, and it is desirable to prepare efficient stabilizing compositions using a smaller quantity of hydrotalcite.

DESCRIPTION OF THE INVENTION

The invention relates, in the first place, to a new and efficient stabilizing composition for thermoplastic resins, which composition is a ternary system comprising a hydrotalcite, a zinc zeolite and a zinc carboxylate.

The composition according to the invention preferably comprises:

approximately 60–80% by weight of a hydrotalcite, approximately 10–20% by weight of a zinc zeolite, and approximately 10–20% by weight of a zinc carboxylate.

The advantages of the ternary system according to the invention reside in an improved long-term stability to heat and to light.

The hydrotalcites which are usable in the compositions according to the invention may be chosen from the hydrotalcites described above.

Zinc zeolite is an aluminosilicate of the molecular sieve type, of general formula:

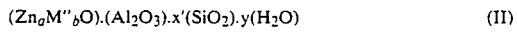

$$(Zn_aM''_bO)\cdot(Al_2O_3)\cdot x'(SiO_2)\cdot y(H_2O) \qquad (II)$$

in which:

M'' is a cation of valency n' a and b are numbers which satisfy the relationship $2a + bn' = 2$, with $a \neq 0$, x' is a number equal to or greater than 1 and y is a number $\geq 0$.

Especially suitable zeolites are compounds in which a is between 0.1 and 1.

Zinc zeolites may be synthesized by cation exchange, starting with commercially available sodium zeolites of formula:

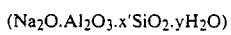

$$(Na_2O\cdot Al_2O_3\cdot x'SiO_2\cdot yH_2O)$$

The zinc carboxylates comprise the carboxylic acid salts, preferred carboxylic acids being fatty acids such as caprylic, octanoic, pelargonic, capric, undecanoic, lauric, myristic, palmitic, stearic, isostearic, oleic, linoleic, behenic, suberic, azelaic, sebacic, dioleic, malic, tartaric or phthalic acids.

As stated above, suitable hydrotalcites are mentioned in U.S. Pat. No. 4,299,759, the content of which is incorporated by reference in this application.

The hydrotalcite of the formula:

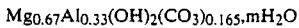

$$Mg_{0.67}Al_{0.33}(OH)_2(CO_3)_{0.165}\cdot mH_2O$$

(m being between 0 and 0.3), which is sold by the company KYOWA Chemical Industry Co. Ltd. of TOKYO Japan under the brand name "Alcamizer II", is used most especially.

Other additives may be used in the compositions of the invention, such as epoxides (for example epoxidized soybean oil or castor oil); phosphorous derivatives (for example triphenyl phosphite or diphenyldecyl phosphite); mercaptans (for example hydroxylated thioesters and thioacids); phenolic antioxidants, nitrogen compounds (for example dihydropyridines, α-phenylindole, β-aminocrotonates); β-diketones; and other additives known to those skilled in the art.

According to this invention, thermoplastic resins and, in particular, resins containing halogens and/or compounds of an acidic nature contributed by the catalysts and/or the monomers and/or post-halogenation, including olefinic resins containing halogens originating from the polymerization catalysts and/or post-halogenation, are stabilized against thermal or ultraviolet degradation.

Examples of thermoplastic resins which can be stabilized according to the invention are thermoplastic resins which contain halogens and/or compounds of an acidic nature that are obtained using catalysts containing halogens and/or compounds of an acidic nature such as sulphuric acid, boron trifluoride, tin tetrachloride and hydrochloric acid (for example polystyrene resins, acrylonitrile/styrene (AS) resins, butadiene/styrene (BS) resins, ABS resins, acrylic or methacrylic resins); thermoplastic resins containing halogens, such as vinyl chloride polymers or copolymers; vinylidene chloride polymers and copolymers; chlorinated or fluorinated rubbers such as chlorinated polyvinyl chloride; chloroprene rubber and chlorinated isobutylene rubber; the polymer or copolymers of post-chlorinated vinyl chloride; vinyl acetate polymer or copolymers, such as polyvinyl acetate or the copolymer of ethylene and vinyl acetate; polytetrafluoroethylene, fluorinated propylene-/ethylene copolymers; polychlorotrifluoroethylene; and mixtures comprising at least two of the polymers, copolymers, resins and rubbers listed above.

As has been specified, the term "thermoplastic resins" containing halogens and/or compounds of an acidic nature applies to olefinic resins containing halogens originating from the polymerization catalysts and/or posthalogenation. Thus, for example, α-olefin homopolymers and copolymers, copolymers of at least one α-olefin and a diene, the post-chlorinated products of these polymers and copolymers, and mixtures of these olefinic resins containing halogens, for example, polyethylene, polypropylene, poly(1-butene), poly(methyl-1-pentene) and the ethylene/propylene copolymers which are obtained using Ziegler-type catalysts containing halogens, form part of the thermoplastic resins containing halogenated compounds and/or acids employed in this invention.

The invention relates most especially to a composition in which the thermoplastic resin consists of PVC, and in particular flexible PVC.

In the ternary system of the invention, the hydrotalcite is employed in quantities of approximately 60 to 80% of the composition. The zinc zeolite is used at approximately 10-20% of the composition, and the zinc carboxylate is introduced in the proportion of 10-20% of the composition.

More especially, the thermoplastic resin is flexible PVC and the ternary system comprises approximately 65-75% by weight of hydrotalcite, 12.5 to 17.5% by weight of zinc zeolite and 12.5 to 17.5% by weight of zinc carboxylate.

The stabilizing compositions according to the invention may be incorporated in the thermoplastic resins at levels which can range from 0.2 to 10% by weight (relative to the weight of the resin). Preferably, this level is between 0.5 and 3%.

In the non-limiting examples which follow, the PVC samples are stabilized by means of the additive compositions according to the invention, and subjected to the test of colouration on heat treatment. For this purpose, the various constituents are malaxated for 5 minutes at 160° C. on a roller mixer.

The sheets obtained are approximately 1 mm thick.

The test is based on the determination of the gradual change in colour which results from the thermal decomposition of test pieces in the form of strips 25 cm long cut from the abovementioned sheets, which are exposed to heat in an insulated oven maintained at constant temperature.

In addition to the heating chamber, the test apparatus is equipped with an electromechanical system which permits the motion of a removable tray which carries the test pieces and which can emerge from the oven at a predetermined constant speed.

An electronic system controls the speed of motion of the tray and the oven temperature. The change in hue of the sample that has emerged is observed visually for a given oven temperature and a speed of the test.

For each test, the "stability time" is the time which has elapsed before the resin blackens.

The change in hue (colouration) is assessed according to the following classification:

| 10 | 9 | 8 | 7 | 6 | 5 | 4 | 3 | 2 | 1 | 0 |
|---|---|---|---|---|---|---|---|---|---|---|
| white | | | | | yellow orange | | | | | black |

EXAMPLE 1

Preparation of a zinc zeolite 30 g of a sodium zeolite (type 13X) are added to 150 g of ZnSO$_4$.7H$_2$O dissolved in 300 ml of distilled water. The heterogeneous mixture thereby obtained is stirred at room temperature for 24 hours. The zinc zeolite thereby obtained is recovered by filtration, washed twice with distilled water, dried at 150° C. and heated to 300° C.

The zinc concentration is 13.8% (% Na=2.9).

EXAMPLES 2 to 7

A—Thermal stability (time)

An oven is adjusted to 180° C., and the emergence of the test pieces is programmed at 180 minutes.

The compositions tested contain:
a) Common base
100 parts by weight of PVC, having a K value =71
60 parts of dioctyl phthalate
5 parts of epoxidized soybean oil
b) Stabilizing composition

TABLE I

| Constituents of the composition (parts) | Examples No. | | | | | |
|---|---|---|---|---|---|---|
| | 2 | 3 | 4 | 5 | 6 | 7 |
| Hydrotalcite* | 0.7 | 0.7 | 0.7 | 0.7 | 0.7 | 0.7 |
| Zinc stearate | 0.3 | 0.2 | 0.15 | 0.1 | 0.05 | — |
| Zinc zeolite | — | 0.1 | 0.15 | 0.2 | 0.25 | 0.3 |
| Stability time (in minutes) | 141 | >180 | >180 | >180 | >180 | >180 |

*Alcamizer II

B—Thermal stability (colour)

The test of assessment of the colour stability is carried out at 180° C. for variable times. The results are given below.

TABLE II

| | Time (minutes) | | | | | | |
|---|---|---|---|---|---|---|---|
| | 0 | 30 | 60 | 80 | 120 | 150 | 180 |
| | | | Modification of the colour* | | | | |
| Example 2 | 10 | 10 | 9 | 8 | 6 | 0 | 0 |
| Example 3 | 10 | 10 | 9 | 8 | 8 | 8 | 8 |
| Example 4 | 10 | 10 | 9 | 8 | 8 | 8 | 8 |
| Example 5 | 10 | 10 | 8 | 7 | 6 | 6 | 6 |
| Example 6 | 10 | 10 | 6 | 4 | 4 | 4 | 4 |
| Example 7 | 10 | 6 | 5 | 3 | 3 | 3 | 3 |

*10 = unchanged

These examples show clearly that the ternary system of hydrotalcite, zinc carboxylate and zinc zeolite imparts better stability (Examples 3 and 4) than the hydrotalcite-plus-carboxylate system (Example 2).

C—Modifications of the conditions

The tests of Examples 3 to 5 are repeated below at a temperature of 200° C., and the emergency of the test pieces is programmed at 120 minutes.

TABLE III

| | Examples No. (Restatement) | | |
|---|---|---|---|
| Stabilizing composition | 3 | 4 | 5 |
| Hydrotalcite | 0.7 | 0.7 | 0.7 |
| Zinc stearate | 0.2 | 0.15 | 0.1 |
| Zinc zeolite | 0.1 | 0.15 | 0.2 |
| Stability time (in minutes) | 92 | 105 | 105 |

Thermal stability (colour)

TABLE IV

| | Time (minutes) | | | | | | |
|---|---|---|---|---|---|---|---|
| | 0 | 20 | 40 | 60 | 80 | 100 | 120 |
| | | | Modification of the colour | | | | |
| Example 3 | 10 | 10 | 9 | 6 | 4 | 0 | 0 |
| Example 4 | 10 | 10 | 8 | 5 | 5 | 5 | 0 |
| Example 5 | 10 | 10 | 7 | 5 | 5 | 5 | 0 |

These tests show that an increase in the zinc zeolite/zinc carboxylate ratio increases the stability time, although a slight decrease in the colour stability is observed.

EXAMPLES 8 and 9

These tests are carried out at 180° C.; the emergence of the test pieces is programmed at 300 minutes.

The stabilizing composition of Example 3 is compared with two compositions containing other additives.

TABLE V

| | Examples No. | | |
|---|---|---|---|
| | 8 | 9 | 3 (restatement) |
| Barium octoate | 0.8 | — | — |
| Hydrotalcite | — | 0.7 | 0.7 |
| Zinc stearate | 0.3 | 0.3 | 0.2 |
| Zinc zeolite | — | — | 0.1 |
| Stability time (in minutes) | 181 | 150 | 260 |

The change in the colour is shown below:

| | Time (minutes) | | | | | | | | | | |
|---|---|---|---|---|---|---|---|---|---|---|---|
| | 0 | 30 | 60 | 90 | 120 | 150 | 180 | 210 | 240 | 270 | 300 |
| | | | | | Colouration | | | | | | |
| Example 8 | 10 | 10 | 8 | 7 | 7 | 6 | 1 | 0 | 0 | 0 | 0 |
| Example 9 | 10 | 10 | 9 | 8 | 6 | 0 | 0 | 0 | 0 | 0 | 0 |
| Example 3 | 10 | 10 | 9 | 8 | 8 | 8 | 8 | 7 | 5 | 0 | 0 |

These tests show the superiority of the ternary mixture of Example 3, according to the invention.

EXAMPLES 10 to 14

The oven is adjusted to 180° C., with the test pieces left in the oven for 180 minutes.

a) Common base:
100 parts by weight of PVC S 110, ATOCHEM (France),
50 parts by weight of dioctyl phthalate,
2 parts by weight of epoxidized soybean oil.

b) Stabilizing composition:
The hydrotalcite is replaced by calcium stearate. (See Table VI)

TABLE VI

| | Examples No. | | | | |
|---|---|---|---|---|---|
| | 10 | 11 | 12 | 13 | 14 |
| Calcium stearate | 0.44 | 0.44 | 0.44 | 0.44 | 0.44 |
| Zinc stearate | 0.26 | 0.21 | 0.16 | 0.06 | — |
| Zinc zeolite | — | 0.05 | 0.10 | 0.20 | 0.26 |
| Stability time (in minutes) | 136 | 158 | 162 | >180 | >180 |

The change in colour is shown below:

| | Time (minutes) | | | | | | |
|---|---|---|---|---|---|---|---|
| | 0 | 30 | 60 | 90 | 120 | 150 | 180 |
| | | | | Colouration | | | |
| Example 10 | 10 | 10 | 9 | 8 | 7 | 0 | 0 |
| Example 11 | 10 | 10 | 8 | 7 | 6 | 5 | 0 |
| Example 12 | 10 | 10 | 7 | 6 | 5 | 4 | 0 |
| Example 13 | 10 | 8 | 5 | 4 | 3 | 2 | 2 |
| Example 14 | 10 | 7 | 3 | 3 | 2 | 2 | 2 |

The results show that a calcium salt/zinc salt/zinc zeolite ternary composition is not as efficient as the ternary system of the invention.

In effect, in the presence of a calcium salt, gradual substitution of the zinc salt by the zinc zeolite leads to an increase in the stability time, but significantly modifies the initial colour of the PVC.

EXAMPLES 15 to 19

The oven temperature is adjusted to 180° C., and the test pieces are programmed to remain in the oven for 300 minutes.

The test compositions contain:
a) Common base:
100 parts by weight of PVC S 110 (ATOCHEM),
60 parts by weight of dioctyl phthalate.
b) Stabilizing composition:

TABLE VII

|  | Examples No. | | | | |
|---|---|---|---|---|---|
|  | 15 | 16 | 17 | 18 | 19 |
| Hydrotalcite | 0.573 | 0.573 | 0.524 | 0.573 | 0.524 |
| Zinc stearate | 0.245 | 0.123 | 0.123 | 0.123 | 0.123 |
| Zinc zeolite | — | 0.084 | 0.123 | 0.084 | 0.123 |
| Butylated hydroxytoluene | 0.082 | — | — | — | — |
| Epoxidized soybean oil | 5 | 5 | 5 | 3 | 3 |
| Stability time (minutes) | 188 | >300 | >300 | >300 | >280 |

These results show that the ternary compositions of the invention are more thermally stable than the binary systems, even when the level of costabilizer, such as epoxidized soybean oil, is lowered.

While the invention has been described in relation to certain details, it will be understood that variations and modifications may be made by those skilled in the art without departing from the scope of the invention.

What is claimed is:

1. A composition which is usable for the stabilization of thermoplastic resin to heat and/or to light, characterized in that it comprises:
   a) approximately 60 to 80% of a hydrotalcite,
   b) approximately 10 to 25% of zinc zeolite; and
   c) approximately 5 to 20% of a zinc carboxylate.

2. A composition according to claim 1, characterized in that it comprises (by weight):
   a) approximately 60 to 80% of a hydrotalcite
   b) approximately 10 to 20% of a zinc zeolite, and
   c) approximately 10 to 20% of a zinc carboxylate.

3. A composition according to claim 1, characterized in that it comprises (by weight):
   a) approximately 65 to 75% of a hydrotalcite
   b) approximately 12.5 to 17.5% of a zinc zeolite, and
   c) approximately 12.5 to 17.5% of a zinc carboxylate.

4. A composition according to claim 1 in which:
   a) the hydrotalcite is of the general formula $$M_{(1-x)}M'_x(OH)_2A^{n-}{}_{x/n}.mH_2O \quad (I)$$

where:
   M and M' are divalent and trivalent metal cations, respectively,
   x satisfies the relationship $0 < x \leq 0.5$,
   m is a positive number, and
   $A^{n-}$ is an anion of valency n;
   b) the zinc zeolites are of the general formula $$(Zn_aM''_bO).(Al_2O_3).x'(SiO_2).y(H_2O) \quad (II)$$

where:
   M'' is a cation of valency n',
   a and b are numbers which satisfy the relationship $2a + bn' = 2$, with $a \neq 0$,
   x' is a number $\geq 1$, and
   y is a number $\geq 0$; and
   c) the zinc carboxylates are of fatty acids selected from caprylic, octanoic, pelargonic, capric, undecanoic, lauric, myristic, palmitic, stearic, isostearic, oleic, linoleic, linolenic, behenic, suberic, azelaic, sebacic, dioleic, malic, tartaric and phthalic acids.

5. The composition according to claim 1, in which:
   a) the hydrotalcite is of the general formula $$Mg_{(1-x)}M'_x(OH)_2A^{n-}{}_{x/n}.mH_2O$$

in which
   $A^{n-}$ is an anion of valency n selected from the group consisting of $CO_3^{2-}$, $SO_4^{2-}$, $^-O_2C\text{-}CO_2^-$, $HPO_4^{2-}$,
   x satisfies the relationship $0 < x < 0.5$, and
   m is a positive number,
   said hydrotalcite having a specific surface area of less than 30 m$^2$/g and a particle size of less than 5 microns;
   b) the zeolite is a compound of formula II in which
      a is between 0.1 and 1, and
      b is between 0.1 and 1; and
   c) the carboxylic acid from which the zinc carboxylate is derived possesses a number of carbon atoms between approximately 7 and 17.

6. The composition according to claim 1, in which:
   a) the hydrotalcite is of the general formula $$Mg_{0.67}Al_{0.33}(OH)_2(CO_3)_{0.165}.mH_2O$$

m is a positive number between 0 and 0.3;
   b) the zinc zeolite is derived from a sodium zeolite of the 13 X type, and
   c) the zinc carboxylate is zinc stearate.

7. A composition according to any one of claims 1 to 6, which further comprises one or more of the following additives:
   epoxides chosen from epoxidized soybean oil or castor oil,
   phosphorous derivatives chosen from triphenyl phosphite or decyldiphenyl phosphite,
   mercaptans chosen from hydroxylated thioesters or thioacids,
   phenolic antioxidants,
   nitrogen compounds chosen from dihydroxypyridines, α-phenylindole and β-aminocrotonates,
   and β-diketones.

8. A thermoplastic resin composition comprising a composition according to any one of claims 1, 4, 5, or 6 and a thermoplastic resin.

9. A thermoplastic resin composition according to claim 8 in which the thermoplastic resin contains halogens and/or compounds of an acidic nature.

10. A thermoplastic resin composition according to claim 8 in which the thermoplastic resin is chosen from the group consisting of:
   polystyrene resins, acrylonitrile/styrene, butadiene/styrene, acrylonitrile/butadiene/styrene resins, acrylic or methacrylic resins vinyl chloride polymers and copolymers or vinylidene chloride polymers and copolymers, chlorinated or fluorinated rubbers, polymers and copolymers of post-chlorinated vinyl chloride, vinyl acetate polymers and copolymers, polytetrafluoroethylene, fluorinated propylene/ethylene copolymers, polychlorotrifluoroethylene, α-olefin homo- and copolymers obtained using Ziegler catalysts, and mixtures of at least two of the abovementioned resins, polymers, copolymers and rubbers.

11. A thermoplastic resin composition according to claim 8 in which the thermoplastic resin comprises polyvinyl chloride.

12. The thermoplastic resin composition according to claim 8, characterized in that it contains, for 100 parts of thermoplastic resin, from 0.2 to 10 parts of said stabilizing composition.

13. The thermoplastic resin composition according to claim 12, characterized in that it contains from 0.5 to 3 parts of said stabilizing composition.

* * * * *